June 1, 1965 P. D. DODD ET AL 3,187,309

COMPUTER MEMORY

Filed Aug. 16, 1963 2 Sheets-Sheet 1

INVENTOR.
PAUL DAVID DODD
GEORGE L. OWENS

BY Arthur Decker

ATTORNEY 3,187,309
COMPUTER MEMORY

Paul David Dodd, San Jose, and George L. Owens, Los Gatos, Calif., assignors to International Business Machines Corporation, New York, N.Y., a corporation of New York Filed Aug. 16, 1963, Ser. No. 302,508
12 Claims. (Cl. 340—173)

This invention relates to computer memories for storage of information and more particularly to a memory utilizing capacitive coupling to represent storage of binaries.

As a result of recent intense efforts by practitioners of the electronic and mechanical arts in improving techniques of component miniaturization, matrices of passive elements have become admirably suited for fabrication of memories of high storage capability. The elements may utilize any one or combinations of electrical effects such as magnetic remanence, resistance, unilateral conductance, capacitance, etc., as the particular application may dictate.

A memory in which data storage is not required to be changed is generally identified as "read-only" and may advantageously be employed in a computer organization involving repeated reference to table storage of data, whether comprising an accumulation of arithmetic results (sums, trigonometric functions, etc.) or business statistics (rates, time schedules, etc.), or programs (input-output routines, special subroutines, branching routines, etc.) or involving data conversion for purposes of display by an output device such as a cathode ray tube or printer. Capacitance read-only memories have been disclosed; structurally, they may be in planar matrix form in which parallel conductors are deposited on both sides of a dielectric material at right angles such that a small capacitor is formed where conductors cross and, operatively, two types have been recognized. In one, the presence or absence of charge in a capacitor is taken as a binary; this type is not considered appropriate to storage for long time periods because of charge dissipation through leakage paths. In the other, the presence or absence of capacitance couplings at selected conductor crossings in the matrix provides the binary; this type is well suited for permanent storage regardless of the number or frequency of accesses made by the computer system. The present invention may be characterized as the latter type of capacitance read-only memory and thus accomplishes the object of providing non-destructive storage. It furthermore provides this function in a simple, economical, efficient, space-conserving matrix construction.

As this description proceeds, it will also be noted that the memory of the present invention provides consistently usable readout signals (i.e., the memory is characterized by a good signal-to-noise ratio and relatively low signal attenuation) despite the loading down of a selected readout (i.e., sense) line by the stray or distributed capacitance of those unselected. It will become apparent that this problem has been solved in the present fabrication by utilizing A.-C. drive to the matrix input (i.e., drive) lines and "tuning out" the stray capacitance. The art recognizes that such tuning may be accomplished by mounting an appropriate inductor at each capacitor in the memory but also recognizes that this type of arrangement is complex and expensive to construct. Therefore, the invention features, for each storage (i.e., "memory") matrix, a parallel and complementary matching (i.e., "padding") matrix which operates to standardize the total distributed and stray capacitance at a value which is tuned by a single inductance installed at the sense circuit of the readout lines.

It is another object of this invention to provide a memory which may be operated at speeds considerably in excess of those previously known.

The foregoing and other objects, features and advantages of the invention will be apparent from the following more particular description of preferred embodiments of the invention, as illustrated in the accompanying drawings.

Figure 1:
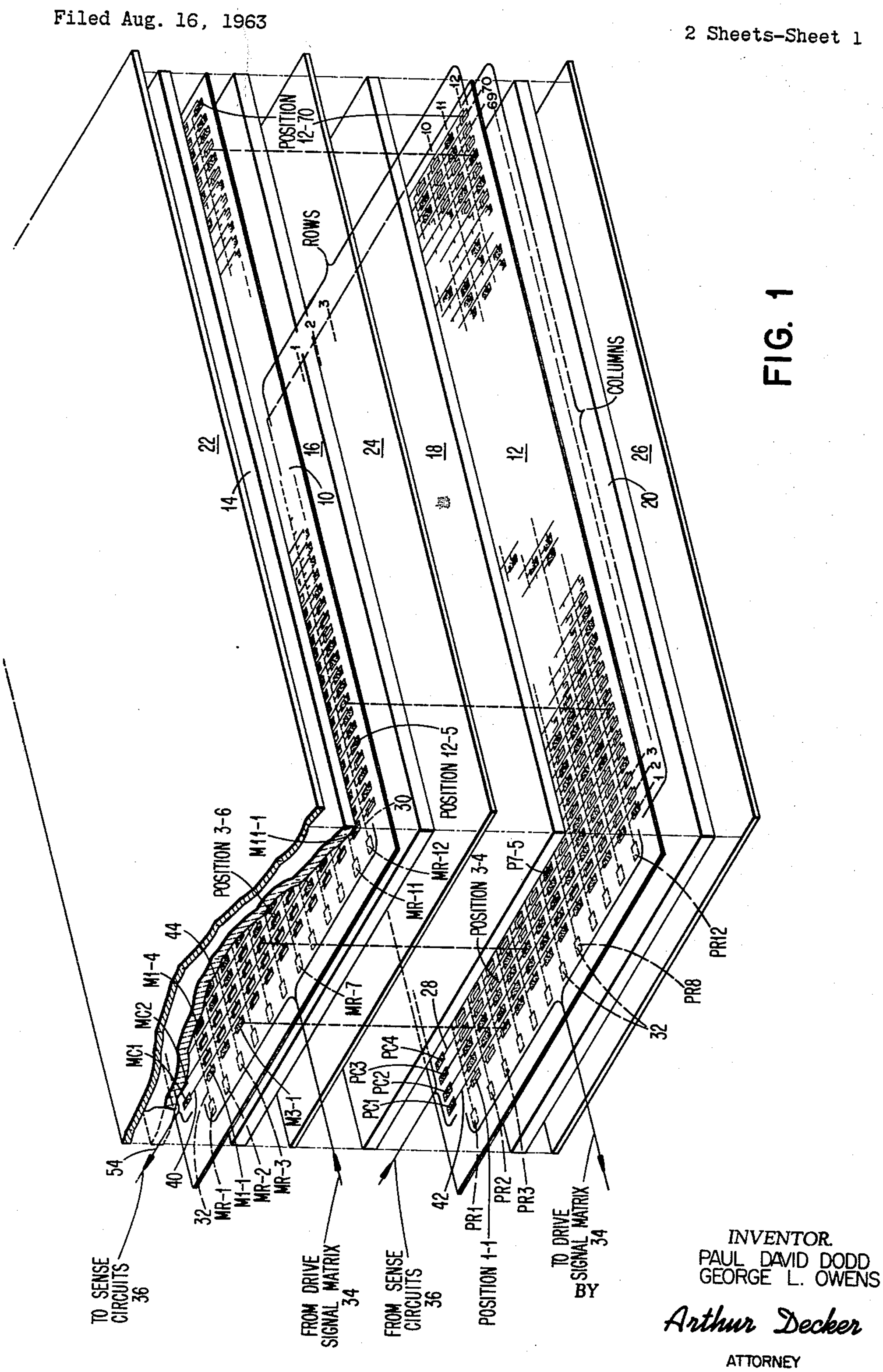
FIGURE 1 is an oblique view of a memory in accordance with the invention, "exploded" to show the construction.

Referring now to FIGURE 1, a memory constructed as taught by the present invention comprises a "sandwich" of planar insulators, conductors and a pair of capacitor cards. Capacitor cards 10 and 12 are of identical fabrication, although of different configuration, and are printed circuit cards in which printed circuit techniques may be utilized for construction. As an example, cards 10 and 12 may include an insulating base of some plastic such as Teflon * or Mylar * on both surfaces of which is deposited a conductor such as copper, in patterns which define electrical components to be described. Insulating spacers 14, 16, 18 and 20, which may also be of Teflon,* are placed one on each side of cards 10 and 12, and shield plates 22, 24 and 26 which also may be of copper, form the outer layers of the sandwich and isolate electrically between cards 10 and 12. Shield plates 22, 24 and 26 protrude from the assembly along the longitudinal dimension for ease of handling, grounding and attachment to associated equipment.

With regard to cards 10 and 12, the pattern of deposition of the conductor is such as to define electrical components: capacitors positioned in an orderly array of columns and rows, a connecting tab for each column and each row and connecting links (lines) among the capacitors and tabs. As an example, the embodiment of card 10 of FIGURE 1 contains 840 positions arranged in 12 rows and 70 columns, each position identified by its row number followed by its column number, e.g., position 3–4, position 12–5, position 12–70. By deposits of conductor on both sides of card 10 at each of the 840 positions, in the form of a rectangle approximately one-eighth inch by one-sixteenth inch, 840 small capacitors are formed; where a capacitor is not required at a position, it may be punched out to leave a rectangular hole of these dimensions by standard card punch apparatus. For reasons which will be made apparent hereinafter, card 10 is designated a memory card and card 12 is designated a padding card. The punch pattern for cards 10 and 12 are complementary, that is a position punched on the former is not punched on the latter and vice versa. Thus, memory card 10 contains capacitors in positions 12–5 and 12–70 but no capacitor in position 3–6 whereas padding card 12 contains a capacitor in position 3–6 but no capacitors in positions 12–5 and 12–70. For identification, capacitors on a card retain their position designations, but preceded by an M or P depending on whether they are on memory card 10 or padding card 12, respectively; thus, capacitors M11–1, P7–5.

At the end of each column and on one surface of cards 10 and 12 and at the end of each row on the other surface there is deposited a similar tab conductor: those corresponding to columns on memory card 10 are designated MC1, MC2 . . . MC70, those corresponding to rows are designated MR1, MR2 . . . MR12, while those corresponding to columns of padding card 12 are designated PC1, PC2 . . . PC70 and those corresponding to rows are designated PR1, PR2 . . . PR12. (Card components shown dashed are on the underside in the view of

* Teflon and Mylar are trademarks of E. I. du Pont de Nemours and Co., Inc.

FIGURE 1.) The tabs are located on extensions of the sides of cards 10 and 12 projecting beyond the volume of the sandwich in order that connection to associated equipment be facilitated. Connection between card positions and tabs is made by means of narrow conductor links such as links 28, 44, etc., and it is to be noted that, in order to avoid discontinuity of links where a capacitor is deleted, a capacitor position is offset, in the shown case to the left and below, the point of crossover (overlap) of the corresponding conductors.

Figure 2:
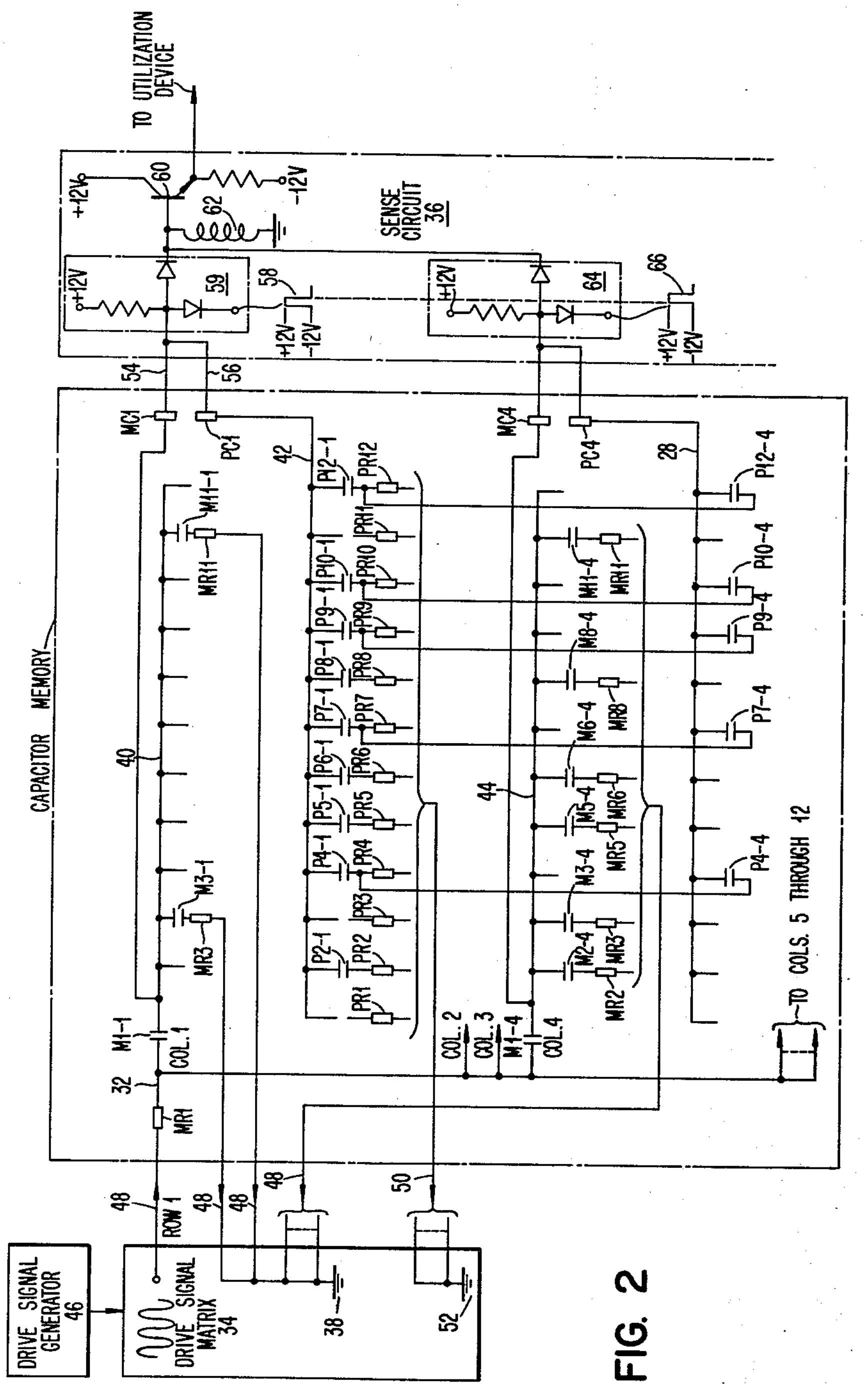
FIGURE 2 is a schematic diagram of part of the memory of FIGURE 1 in association with drive and sense circuitry.

FIGURE 2 shows the circuitry of the exemplary capacitor memory of FIGURE 1 and associates it with a drive signal generator 46, a drive signal matrix 34 and a sense circuit 36, as would be characteristic of a computer environment.

Drive signal generator 46 emits a sine wave signal to drive signal matrix 34, which operates as a switching network to allocate the drive signal to the rows of memory card 10 in required sequence on lines 48; however, for simplification, the figure shows the connections of the capacitor memory only for that portion of a sequence during which row 1 is selected and driven. Thus, the topmost line 48, connecting to tab MR1 of row 1 carries the drive signal whereas matrix 34 provides a common ground point 38 for the other lines 48 leading to the other 11 MR tabs. In addition, all PR tabs are connected to ground 52 in matrix 34 via line 50. It should thus be understood that ground 38 is switched, depending upon which row of memory card 10 is being driven, whereas ground 52 is a permanent connection.

The arrangement in FIGURE 2 indicates that, regardless of how many memory card capacitors are connected to a row, only one couples matrix 34 to sense circuit 36 whereas all other memory card capacitors in the row are electrically ineffective and all padding card capacitors corresponding to the column effectively form a shunt capacitance across the input to sense circuit 36.

Sense circuit 36 receives the output (already loaded by capacitors M3–1 and M11–1 by way of line 40) from the memory via tab MC1 and line 54, and, by connecting line 54 to line 56, also loads this output with capacitors P2–1, P4–1, P5–1, P6–1, P7–1, P8–1, P9–1, P10–1 and P12–1, which are shunted across line 42 and connected to ground 52 through their respective PR tabs. Thus, the complementary configuration of the two cards of the memory provides substitute padding capacitors for row positions not occupied by memory capacitors. As a result, any memory capacitor selected for coupling matrix 34 and sense circuit 36 is shunted by the same number of capacitors. Returning to sense circuit 36, line 54 is diode-clamped at voltages provided by gating signal 58 and gating circuit 59; at +12 v. when drive signal matrix 34 activates tab MR1, and at −12 v. otherwise. The former voltage gates the signal through to be amplified by transistor 60 and tranmsitted to a utilization device (not shown). Since the shunt capacitance across line 54 is "standardized" to a prescribed value, it may be resonated, in the form of a parallel resonant circuit, with a fixed-value inductor 62 and thereby provide increased signal gain. A similar gating circuit is connected to each MC and PC tab of the memory, but those unselected are biased at their inputs by gating signals such that they are ineffective to drive the utilization device. Thus, gating circuit 64, corresponding to tabs MC4 and PC4, is biased by signal 66 at −12 v., thereby preventing all column 4 capacitors from affecting the utilization device. In this respect, it should be obvious that provision of a sense circuit for each column and replacement of the gating signals by appropriate constant potentials, the memory would be characterized by parallel read-out capability.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A computer memory, comprising:

a first planar matrix having a fixed number of overlapping conductors and a capacitive junction associated with each point of overlap, each junction formed by extensions of the conductors and capable of being removed if not required for storage;

a second planar matrix having the same number of overlapping conductors as said first planar matrix and a capacitive junction associated with each point of overlap, the junctions being formed by extensions of the conductors, said second matrix having removed those junctions corresponding to the junctions remaining in said first matrix; and, a single terminating impedance for a plurality of conductors of both said matrices connected to said matrices such that they comprise a single memory plane.

2. The memory of claim 1, wherein the conductors of said matrices overlap perpendicularly.

3. The memory of claim 2, wherein each junction is offset from its associated conductors such that conductor discontinuity is avoided.

4. The memory of claim 3 wherein the conductors and capacitive junctions of said matrices comprise deposits of conductive material on an insulating base suitably rigid for satisfactory handling by card punch equipment.

5. The memory of claim 4 wherein the conductors form a plurality of parallel rows on one side of the base and a plurality of parallel columns on the other side of the base and the plates of each capacitor formed at the junctions are on opposite sides of the base.

6. The memory of claim 5 wherein the width of the capacitor plates at the junctions exceeds the conductor width.

7. The memory of claim 6 and means to electrically isolate between said matrices when adjacently positioned.

8. The memory of claim 7 wherein said isolating means comprises a pair of insulating cards one cojoining each of said matrices and a conductive card between said insulating cards, thereby forming with said matrices a memory stack.

9. The memory of claim 8 wherein said insulating cards are dimensionally within the memory stack whereas said conductive card and matrices include ends protruding beyond the dimensions of said memory stack for purposes of connecting to associated equipment.

10. The memory of claim 9 wherein a connection tab is deposited for each conductor on the protruding ends of said matrices.

11. A computer memory system, comprising:

a printed circuit capacitive memory card having capacitive junctions adjacent overlap points of a set of lateral parallel conductors on one side of said card with a set of longitudinal parallel conductors on the other side of said card, selected ones of the junctions being punched out of said card;

a printed circuit capacitive padding card also having capacitive junctions adjacent overlap points of a set of lateral parallel conductors on one side of said card with a set of longitudinal parallel conductors on the other side of said card, selected ones of the junctions being punched out of said card such that the remaining capacitive junction pattern is complementary to that of said memory capacitor card;

a drive signal generator connected selectively to the longitudinal conductors of said memory card;

a common connection for those longitudinal conductors of said memory card not being driven by said drive signal generator and all longitudinal conductors of said padding card; and, a sense circuit connected to each lateral conductor of said memory and padding cards, said sense circuit including means to connect between its lateral conductors and an inductance forming a resonant circuit with the total capacitance at the connection.

12. The memory of claim 11 in which said drive signal generator provides a sinusoidal signal at which the resonant circuit of said sense circuit comprises a high impedance.

References Cited by the Examiner

UNITED STATES PATENTS

| | | | |
|---|---|---|---|
| 2,872,664 | 2/59 | Minot | 340—173 X |
| 3,098,996 | 7/63 | Kretzmer | 340—173 |
| 3,098,997 | 7/63 | Means | 340—173 |

IRVING L. SRAGOW, *Primary Examiner.*